(12) United States Patent
Spear et al.

(10) Patent No.: US 8,224,881 B1
(45) Date of Patent: Jul. 17, 2012

(54) SYSTEM AND METHOD FOR MANAGING WELDING INFORMATION

(75) Inventors: Theresa M. Spear, Highland Heights, OH (US); George Daryl Blankenship, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 1984 days.

(21) Appl. No.: 09/883,588

(22) Filed: Jun. 18, 2001

(51) Int. Cl.
*G06F 17/30* (2006.01)
*G06F 17/00* (2006.01)

(52) U.S. Cl. ......... 707/899; 228/112.1; 228/2.1; 455/39

(58) Field of Classification Search .................. 707/1, 2, 707/3, 4, 5, 6, 7, 8, 9, 10, 101, 102, 104.1, 707/706, 899; 717/128; 219/109; 228/112.1, 228/2.1, 103; 455/39
See application file for complete search history.

(56) References Cited

U.S. PATENT DOCUMENTS

| | | | |
|---|---|---|---|
| 5,808,885 A * | 9/1998 | Dew et al. ........................... 700/3 |
| 5,923,756 A * | 7/1999 | Shambroom .................. 713/156 |
| 5,937,414 A * | 8/1999 | Souder et al. .................. 707/203 |
| 5,953,707 A * | 9/1999 | Huang et al. ..................... 705/10 |
| 6,024,273 A | 2/2000 | Ludewig et al. |
| 6,051,805 A * | 4/2000 | Vaidya et al. ............. 219/130.01 |
| 6,281,465 B1 | 8/2001 | Muller et al. |
| 6,415,276 B1 * | 7/2002 | Heger et al. ...................... 706/52 |
| 6,479,792 B1 * | 11/2002 | Beiermann et al. ......... 219/130.5 |
| 6,605,800 B1 | 8/2003 | Schick et al. |
| 6,707,003 B2 * | 3/2004 | Rouault ..................... 219/137 R |
| 6,797,921 B1 | 9/2004 | Niedereder et al. |
| 7,761,336 B1 * | 7/2010 | Blankenship et al. ....... 705/26.1 |

FOREIGN PATENT DOCUMENTS

| | | |
|---|---|---|
| DE | 296 17 200 U1 | 11/1997 |
| EP | 0 865 858 A | 9/1998 |
| WO | 98/14300 A1 | 4/1998 |
| WO | 00/23223 | 4/2000 |
| WO | 01/12374 | 2/2001 |

OTHER PUBLICATIONS

Quinn, et al. "A Welding Cell with its own Website," Welding Journal, Jan. 1, 2000, XP000931841. http://www.isd.mel.nist.gov/documents/quinn/Welding_cell.pdf. Last accessed Oct. 13, 2010, 9 pages.

(Continued)

*Primary Examiner* — Yicun Wu
(74) *Attorney, Agent, or Firm* — Pearne & Gordon LLP

(57) ABSTRACT

A system and method for managing welding information is provided. The invention includes a remote system, a client system and/or a welder. The invention further provides for establishment of a secure connection for transmission of information between the remote system and the client system and/or the welder and/or establishment of access rights of a user/client system/welder. The invention further provides for formulating of a query based upon a request for welding information from a user/welder/client system and searching of data store(s) based at least in part upon the request and/or access rights. The invention further includes filtering of search results and a design of experiment(s) component to facilitate creation of welding procedure(s). The invention further includes calculation of weld costs for potentially suitable welding procedure(s) and communication with a customer's resource planning system in order to facilitate further automation in the industrial environment.

14 Claims, 11 Drawing Sheets

OTHER PUBLICATIONS

Gilsinn, et al. "A Welding Cell that Supports Remote Collaboration," Ninth International Conference on Computer Technology in Welding, Sep. 28-30, 1999. http://www.isd.mel.nist.gov/documents/gilsinn/Remote_Weld_Cell.pdf, Last accessed Oct. 13, 2010, 7 pages.
ISR mailed Aug. 7, 2002 for PCT Application No. PCT/US02/14468, 2 pages.
Examiner's first report dated Mar. 13, 2007 for Australian Patent Application No. 2002318120, 6 pages.
European Search Report for European Application No. EP 02 74 7821 dated Mar. 19, 2009, 3 pages.
JPOA mailed Jun. 20, 2008 (with translation), due Sep. 20, 2008 for Japanese Patent Application No. 2003-505814, 8 pages.
JP OA mailed Nov. 20, 2009 (with translation), due Feb. 20, 2010, for Japanese Patent Application No. 2003-505814, 9 pages.
KROA Due Jan. 28, 2009 for Korean Patent Application No. 10-2003-7016497 (with translation), 6 pages.
KROA Due Jul. 29, 2009 for Korean Patent Application No. 10-2003-7016497 (with translation), 6 pages.
EP Examination Report dated Jul. 15, 2009 for European Patent Application No. 02-747-821.3-2221, 4 pages.
CAOA dated Aug. 11, 2010, due Feb. 11, 2011, for Canadian Patent Application No. 2,449,821, 7 pages.
English translation of JP Patent Application Publication No. 07-241674, published Sep. 19, 1995, 24 pages.
English translation of JP Patent Application Publication No. 11-347733, published Dec. 21, 1999, 18 pages.
English translation of JP Patent Application Publication No. 2001-105138, published Apr. 17, 2001, 33 pages.
Japanese Official Notice of Final decision of Rejection, mailed on Apr. 5, 2011 for Japanese Patent Application No. 2003-505814, 2 pages (English Translation).
Japanese Official Notice of Decision to decline the amendment, mailed on Apr. 5, 2011, for Japanese Patent Application No. 2003-505814, 7 pages (English Translation).

* cited by examiner

FIG. 7

SYSTEM AND METHOD FOR MANAGING WELDING INFORMATION

TECHNICAL FIELD

The present invention relates generally to computer and welding systems. More particularly, the present invention relates to a system and method for managing welding information.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of an assembly process, wherein sophisticated controllers enable individual welders to operate within relevant portions of the process. For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger manufacturing environments and many times are spread across multiple manufacturing centers. Given the nature and requirements of modern and more complex manufacturing operations however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall assembly process. Thus, controlling, maintaining, servicing and supplying multiple and isolated locations in large centers, and/or across the globe, has become more challenging, time consuming and expensive.

One such challenge relates to managing information associated with welding (e.g., welding procedure(s) and welding document(s)). For example, a customer may desire to disseminate welding information, such as an approved procedure for welding a particular part, across corporate and/or geographic boundaries. Conventionally, the dissemination of welding information can occur via and awkward combination of technical bulletins from manufacturers and/or local dissemination of information by consumers of welding products. Further, selection and/or development of welding procedure(s) based upon customer requirement(s) can be a difficult, time intensive task for welding engineers. Welding engineer may take into account relative weld costs based upon, for example, costs associated with welding consumable(s) and/or labor costs at various geographic locations. This can be time-consuming and can lead to inconsistent results since conventionally physical documentation of welding procedure(s) and/or costs have typically been incomplete and inconsistent.

Due to the problems described above and other problems associated with conventional systems, there is an unsolved need for a system and method for managing welding information.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for managing welding information in which a welder is connected to a remote system via a network. For example, the welder can request the remote system to search for welding information (e.g., welding procedure(s) and/or documentation) based upon specified parameter(s) (e.g., weld parameter(s) and/or date of qualification). The present invention further provides for a client system to be connected to the remote system via a first network and, optionally, to a welder via a second network.

According to an aspect of the present invention, the remote system can have a security component for establishing a secure connection between a welder/client system/user and the remote system. Additionally, the security component can establish access rights for the welder/client system/user.

Another aspect of the present invention provides for the remote system to have a query component for formulating search criteria to be used by a search component. Once a query has been formulated, the search component searches a welding information data store and/or a customer welding information data store, at least in part, upon search criteria received from the welder/client system/user and/or access rights of the welder/client system/user.

Yet another aspect of the present invention provides for the remote system to include a filter component adapted to filter results of the search component and a design of experiment(s) component to facilitate creation of welding procedure(s) based, at least in part, upon information received from the welder/client system/user and/or set(s) of pre-existing related welding procedure(s) and/or data. The remote system can also include a cost calculation component for determining relative cost(s) associated with welding procedure(s) and a resource planning component for communicating information regarding welding procedure(s) selected by the welder/client system/user to a customer system (e.g., inventory and/or materials management system).

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 7 is a simulated screen shot of a user interface employed with an aspect of the present invention.

DESCRIPTION OF THE INVENTION

Figure 1:
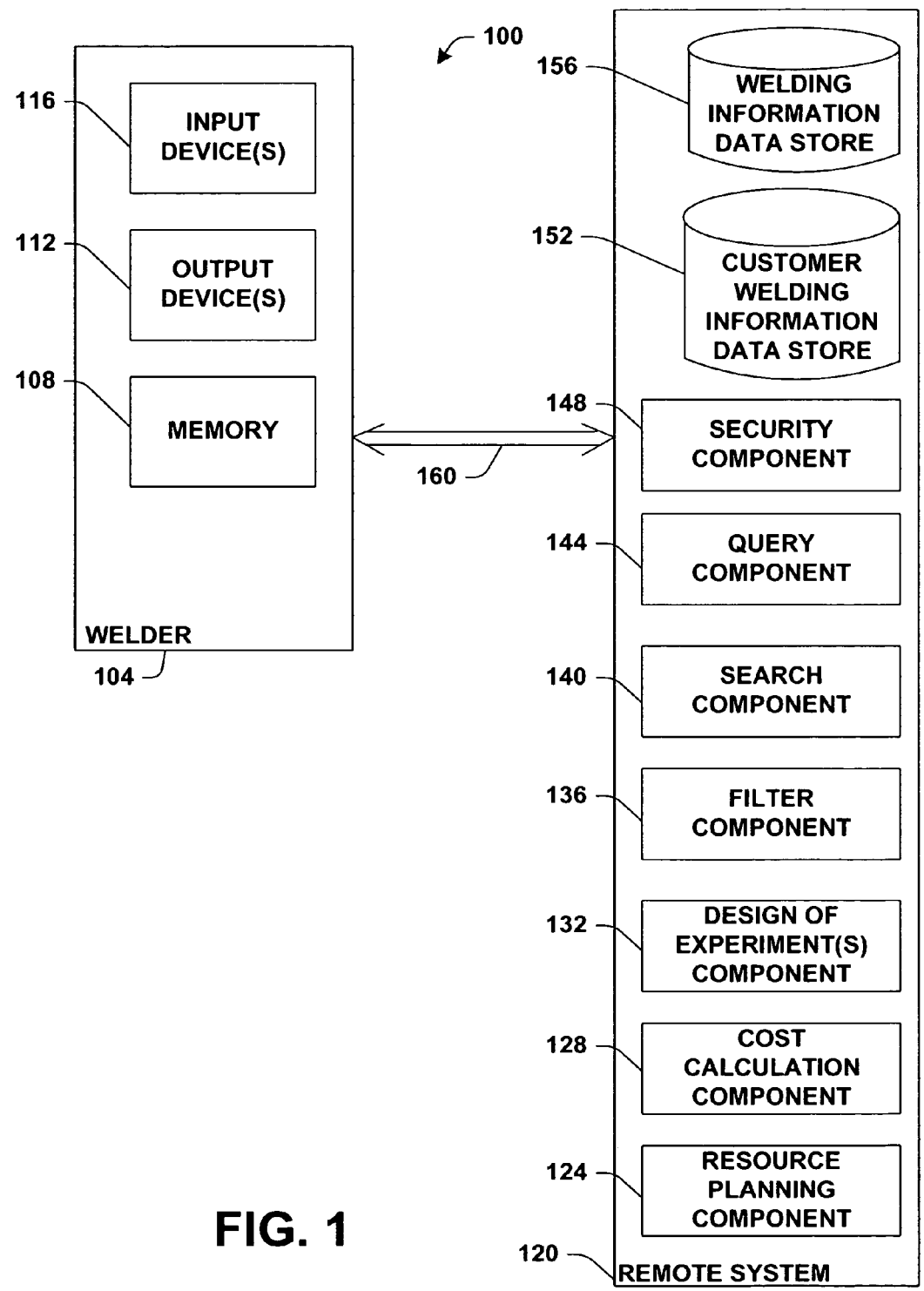
FIG. 1 is a schematic block diagram illustrating a system for managing welding information in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, "system" is a structure comprising one or more components. A "component" is a structure comprising computer hardware and/or software. For example, a component can be, but is not limited to, a computer readable memory encoded with software instructions or a computer configured to carry out specified tasks. By way of illustration, both an application program stored in computer readable memory and a server on which the application runs can be components. Due to the nature of components, multiple components can be intermingled and are often not separate from one another. Systems can likewise be intermingled and inseparable. Further, "extranet" refers to a network of trusted trading partners communicating securely via a network that can be, but is not limited to, the Internet, a local area network, a computer network, an Intranet, a wide area network, a virtual private network, a metropolitan area network, and a wireless network.

A "welder" refers to physical hardware for producing a weld such as a wire feeder, contact tip, dresser, gas mixer, gas sneezer, gas controller, clamp actuator, travel carriage/part manipulator, robot arm/beam/torch manipulator, laser seam tracker, other input/output devices and welding power source along with any controller(s), monitor(s) and communications interface(s) associated with the physical hardware. For example, a welder can be used to perform gas metal arc welding (GMAW), flux cored arc welding, metal cored arc welding, submerged arc welding (SAW), narrow groove welding, gas tungsten arc (GTAW) welding, plasma arc welding, electron beam and laser welding, hard surfacing welding, arc gouging and manual shielded arc welding (SMAW).

"Welding procedure" refers to a step or steps involved in a joining process and can include consumables to be used in the process along with settings for various aspects of a welding system before, during and/or after the joining process. For example, some of these aspects relate to control of power and waveforms supplied to an electrode, movements or travel of a welding tip during welding, electrode travel to other welding points, gas control to protect a molten weld pool from oxidation at elevated temperatures and provide ionized plasma for an arc, and other aspects such as arc stability to control quality of the weld.

Referring to FIG. 1, a system 100 for managing welding information in accordance with an aspect of the present invention is illustrated. The system 100 includes a welder 104 and, optionally, memory 108 an input device(s) 116 and/or output device(s) 112. The welder 104 can utilize the input device(s) 116 to receive information (e.g., weld parameter(s), document request(s)) from a user. For example, the input device(s) 116 can be a keyboard, a personal digital assistant (PDA) communicating with the welder 104, a mouse, a pointing device, a touch screen, a wireless apparatus or other suitable device. The welder 104 can utilize the output device(s) 112 to present welding information to a user. For example, the output device(s) can be a display, personal digital assistant (PDA) communicating with the welder 104, printer or other suitable device. It is to be appreciated that, in accordance with the present invention, the welder 104 can operate without the input device(s) 116 and/or the output device(s) 112.

The welder 104 is operatively coupled via a network 160 to a remote system 120. For example, the network 160 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP and User Datagram Protocol (UDP). Further, the network connection can be via an extranet and/or a shared private network. For example, the network connection can be via a phone connection (not shown) from the welder 104 to an Internet Service Provider (ISP) to the remote system 120. Another possible network connection is via a Local Area Network (LAN) to the remote system 120. It is noted that the welder 104 and associated welding equipment (not shown) can communicate over a separate and isolated network from the network 160 (e.g., Arclink). Information exchanged between and among the welder 104 and the remote system 120 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, XML, PDF, EDI, WML as well as other formats.

The remote system 120 can include a welding information data store 156, a customer welding information data store 152, a security component 148, a query component 144, a search component 140, a filter component 136, a design of experiment(s) component 132, a cost calculation component 128 and a resource planning component 124.

The security component 148 facilitates secure communication between the welder 104 and the remote system 120. Given that welding information may be transferred over public networks such as the Internet, the security component 148 can provide encrypted data communications along with authentication and authorization services between a remote system 120 and the welder 104. Authentication refers to a determination that a purported user or welder 104 is whom they claim to be. Authorization is the process of verifying that a user or welder 104 has been authorized by the remote system 120 to access welding information. Encryption is the conversion of data into a form, such as a ciphertext, that is not easily understood by unauthorized agents. For example, authentication, authorization, and non-repudiation may be established utilizing a Public Key Infrastructure (PKI) and X.509 Public Key Infrastructure Certificates to provide authentication and message integrity. Further, a Secure Sockets Layer (SSL) and Secure HTTP (SHTTP) may be employed to provide authentication and data encryption, wherein proprietary authentication and authorization techniques may be employed utilizing either publicly available encryption algorithms or those of custom design. These protocols, with the exception of those based on a custom design, are readily understood by those of ordinary skill in the art. They are defined in specifications provided in the Request for Comments (RFC) documents from the Internet Engineering Task Force (IETF) and in other sources.

The security component 148 can further employ encryption that can be established utilizing one or more of the following protocols. For example, a PGP, S/MIME protocol may be employed to provide encrypted email. An SSH and/or SSH2 protocol may be utilized to provide encrypted terminal sessions, wherein an Internet Protocol Security (IPSEC) protocol may be employed to provide data encryption. Cloaking techniques may also be employed utilizing either publicly available encryption algorithms and/or those of custom design. These protocols, with the exception those based on a custom design, are readily understood by those of ordinary skill in the art. They are defined in specifications provided in the appropriate Request for Comments (RFC) documents from the Internet Engineering Task Force (IETF) and in other sources.

Negotiations can occur between the security component 148 of the remote system 120 and the welder 104. These negotiations may be utilized to establish a secure (e.g., encrypted) data channel, for example, between the TCP/IP drivers (not shown) of the welder 104 and the remote system 120.

The security component 148 can further define access rights based upon the type of user/welder and/or the particular user/welder. For example, a user having a single welder can be permitted access to welding information accessible to substantially all users while a user having hundreds of welders (e.g., automated factory) possibly spread across various geographical locations can be permitted access to welding information accessible to substantially all users along with information accessible to users associated with a particular entity (e.g., welding procedure(s) for particular part number(s) and/or plant location(s)). The security component 148 thus facilitates secure communication and/or validates access of information based at least in part upon access rights granted to the welder 104 and/or a user.

The welding information data store 156 can store information associated with welding resources, for example, welding consumable(s), welding products (e.g., welder(s)) and/or welding procedures (e.g., technical responses, engineering report(s) and/or certificate(s) of conformance). Information of a general nature can be stored in the welding information data store 156 (e.g., technical bulletins and/or engineering reports) and made accessible to substantially all welders 104 and/or users. Further, information unique (e.g., proprietary and/or confidential) to a particular user and/or group of users (e.g., associated with a particular customer) can be stored in the welding information data store 156 with access to the unique information available to the particular user and/or group of users. Access to information stored in the welding information data store 156 can be based, at least in part, upon access rights received from the security component 148.

The customer welding information data store 152 can store information associated with a particular customer and/or group of customers (e.g., reserved memory locations for customer specific usage and/or application(s) for customer specific usage). For example, the customer welding information data store 152 can store customer specific welding procedure(s) (e.g., based upon customer specific part number(s) and/or customer's specification(s)), customer specific welding procedure qualification record(s) and/or customer specific welder qualification record(s) and other qualification(s) to meet ISO standard(s). The customer welding information data store 152 can serve as a central depository for a customer's welding information across, for example, geographic and/or corporate division boundaries. Thus, welding information associated with a customer's welding process, for example, in South America, can at the customer's direction, be made available to representative(s) of the customer in locations physically remote from the welding location (e.g., North America). Access to information stored in the customer welding information data store 152 can be based upon access rights received from the security component 148.

It is to be appreciated that while the welding information data store 156 and the customer welding information data store 152 have been depicted and described separately, in accordance with the present invention, the customer welding information data store 152 and the welding information data store 156 can be located within the same data storage system or in a distributed storage environment. Further, information in the customer welding information data store 152 and/or the welding information data store 156 can be stored in a variety of data structures including, but not limited to, lists, arrays and/or databases. Further, information in the welding information data store 156 and/or the customer welding information data store 152 can include one or more of the following: data stored in a relational database, data stored in a hierarchical database, text documents, graphical images, audio information, streaming video and other information associated with welding.

The query component 144 facilitates formulating search criteria for the search component 140 to locate welding information for a user and/or a welder 104. For example, the query component 144 can be adapted to extract weld parameter(s) from a user query (e.g., based upon natural language input). Further, the query component 144 can receive information associated with a user query based upon a graphical template requiring certain welding information to be completed (e.g., type of welding process—SMAW, GMAW, GTAW, FCAW-GS, FCAW-SS or SAW) and/or allowing yet other weld information to be specified optionally (e.g., wire diameter).

Figure 2:
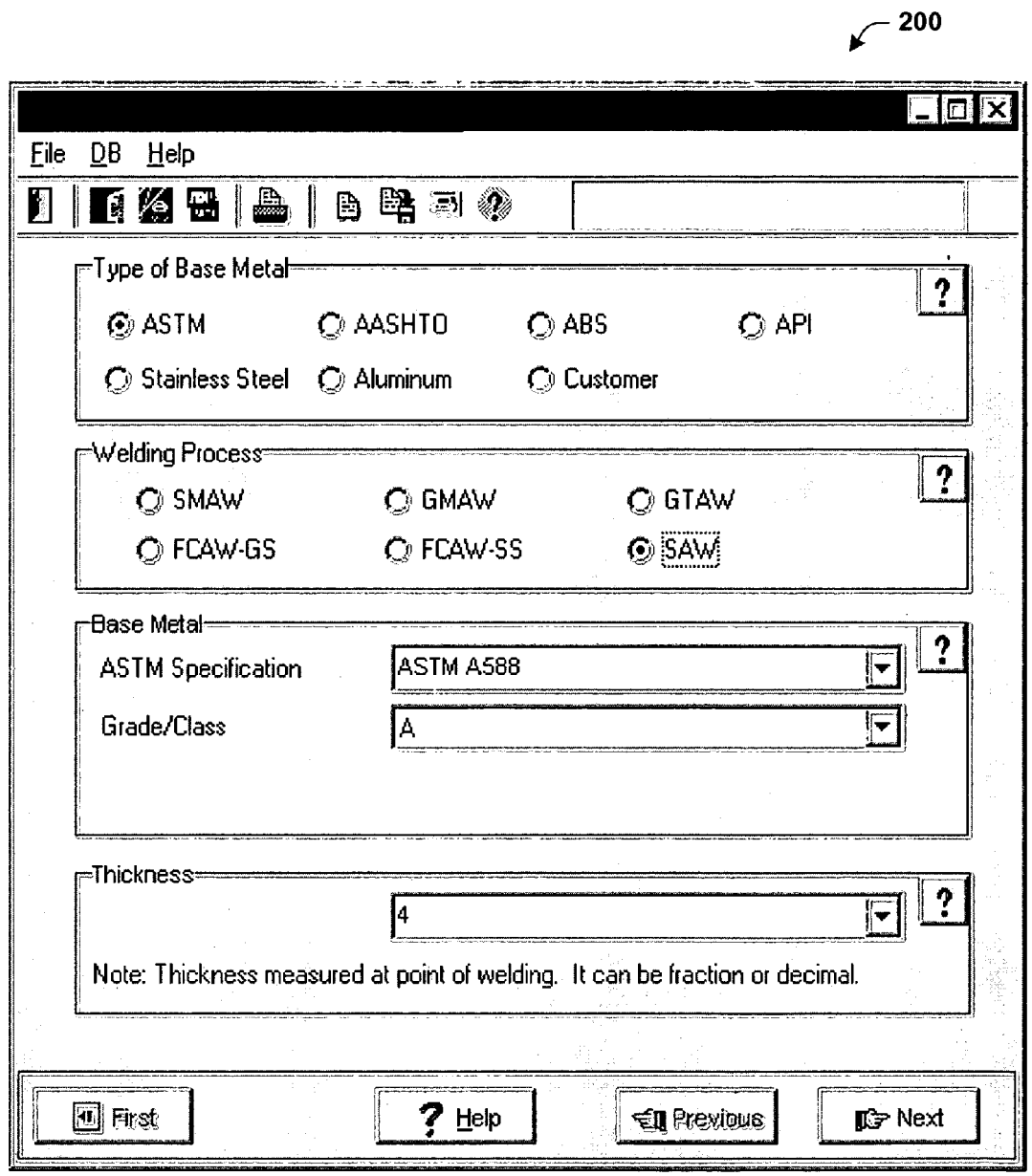
FIG. 2 is a simulated screen shot of a user interface employed with an aspect of the present invention.
Figure 3:
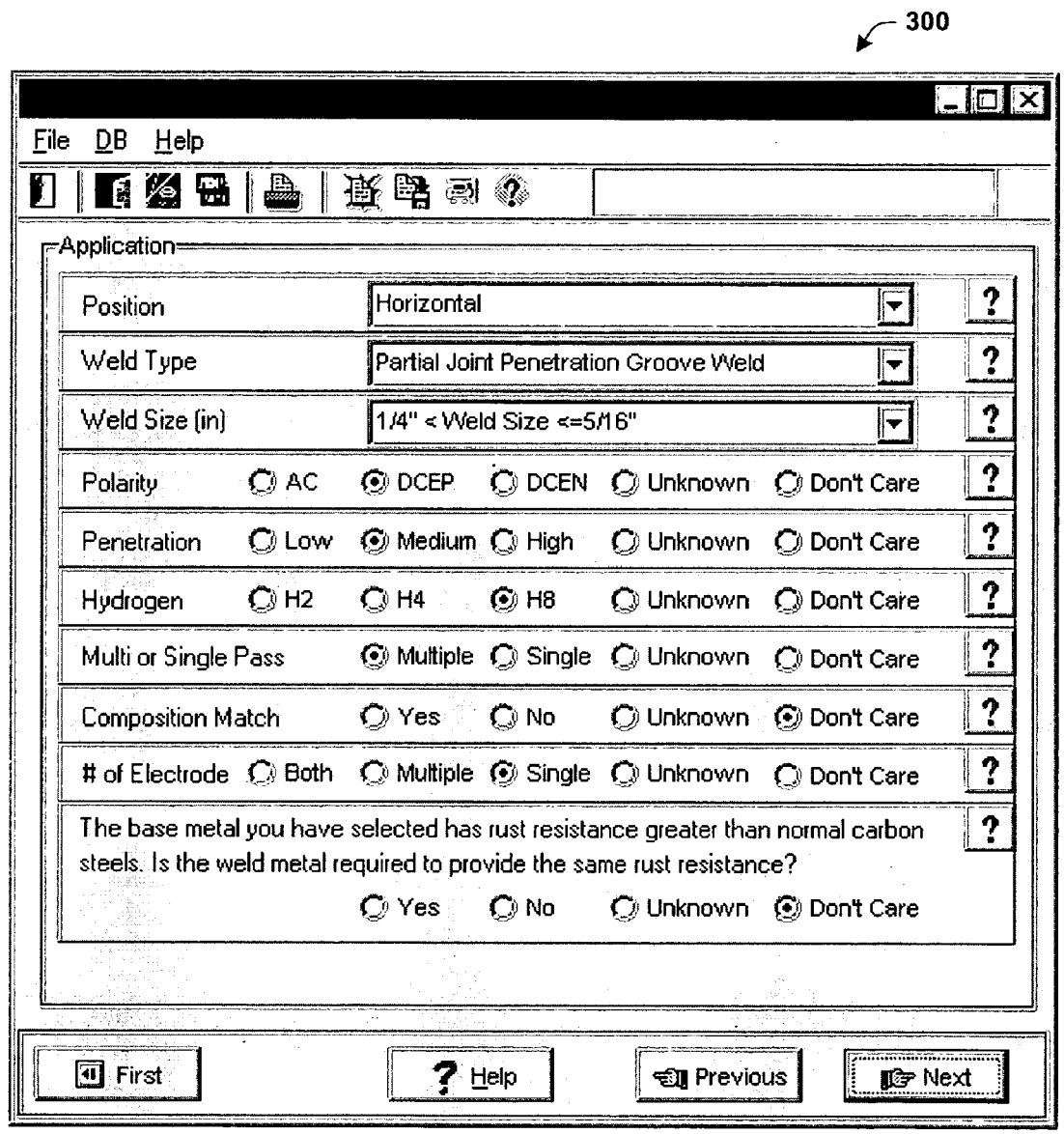
FIG. 3 is a simulated screen shot of a user interface employed with an aspect of the present invention.
Figure 4:
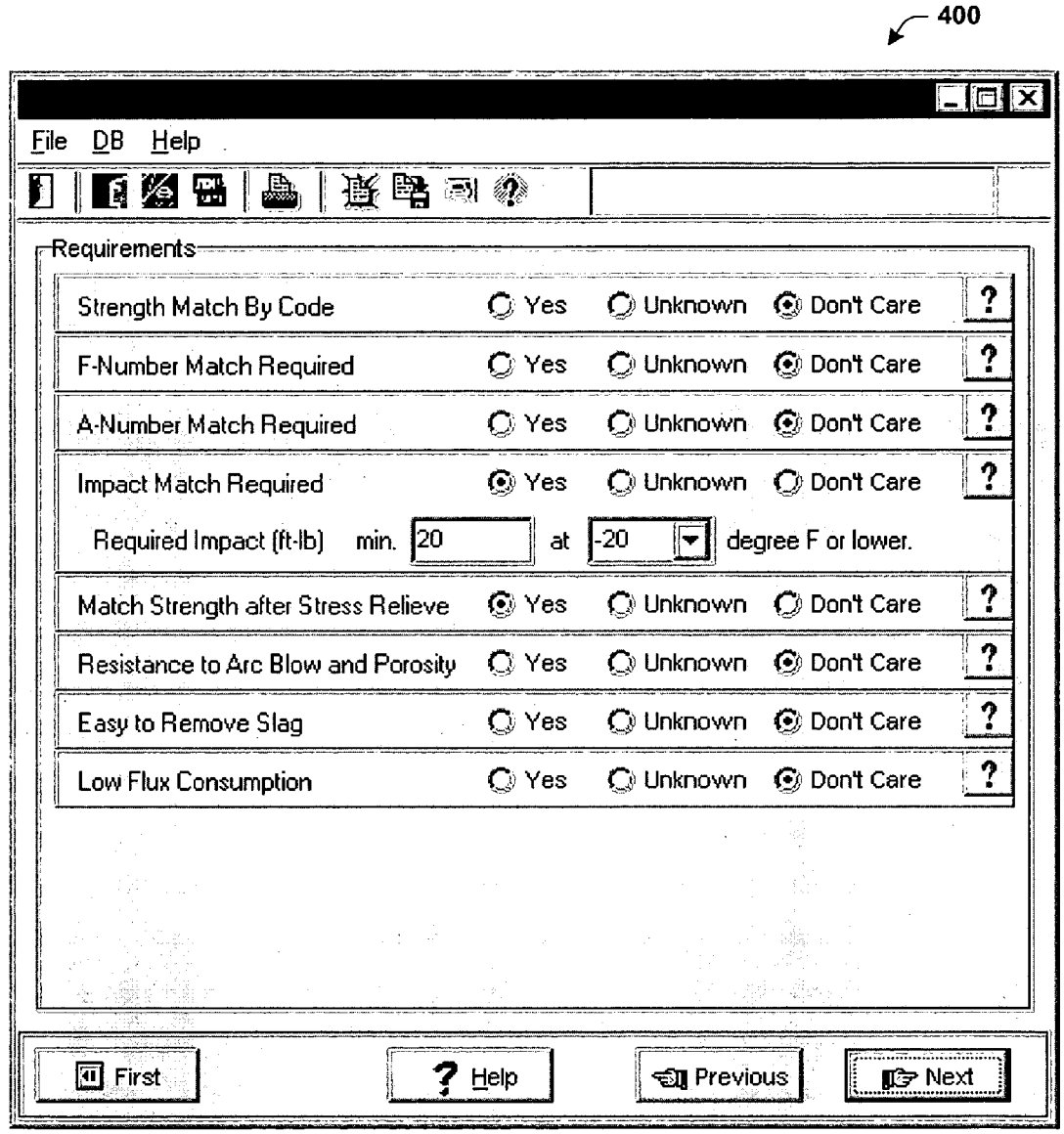
FIG. 4 is a simulated screen shot of a user interface employed with an aspect of the present invention.

Referring now to FIGS. 2, 3 and 4, simulated screen shots 200, 300 and 400 illustrate user interface elements that may be employed to support various aspects of the present invention. For example, a user may desire to know whether any welding procedure(s) exist for a given welder under certain welding conditions (e.g., utilizing certain welding consumable(s) Thus, the screen shots 200, 300 and 400 illustrate a user interface that can be employed to input information concerning welding process. As depicted in screen shots 300 and 400, the welder 104/user can specify certain characteristics of the welding process while leaving other characteristics indeterminate (e.g., "unknown" or "don't care"). While a graphical template with drop down menus is illustrated, it is to be appreciated that other modalities (e.g., text-based and/or non interactive query techniques) and other input elements may be employed in accordance with the present invention.

Referring back to FIG. 1, the query component 144 can further employ an adaptive system wherein the query component is able to identify some and/or substantially all of the welding information based upon information communicated to the query component 144 by the welder 104 and/or user and/or extracted from the welder 104 by the query component 144 (e.g., type of welder, type of wire presently being utilized and/or type of gas presently being utilized). Thus, it is to be appreciated that in accordance with the present invention, the welding information can be received, explicitly and/or implicitly, in a plurality of ways in accordance with the present invention.

In response to receiving a query for welding information from the query component 144, the search component 140 searches for welding information. The search component 140 can employ various techniques (e.g., based upon a Bayesian model, an artificial intelligence model, probability tree networks, fuzzy logic and/or neural network) when searching for welding information. The search component 140 can search, for example, the welding information data store 156 and/or the customer welding information data store 152 for welding information responsive to the query and can determine which resource(s) to search based, at least in part, upon access rights received from the security component 148.

Next, the filter component 136 is adapted to filter result(s) received from the search component 140. For example, the result(s) received from the search component 140 can be ranked according to the likelihood of usefulness (e.g., based on previous history and/or a user's application need(s) and/or parameter(s)), sorted based on welding consumable(s) utilized by a welding procedure and/or arranged by qualification date of welding procedure(s).

Figure 5:
FIG. 5 is a simulated screen shot of a user interface employed with an aspect of the present invention.

FIG. 5 illustrates a simulated screen shot 500 user interface elements that may be employed to support various aspects of the present invention. For example, search results can be presented to the welder 104/user identifying suggested welding consumable(s).

Figure 6:
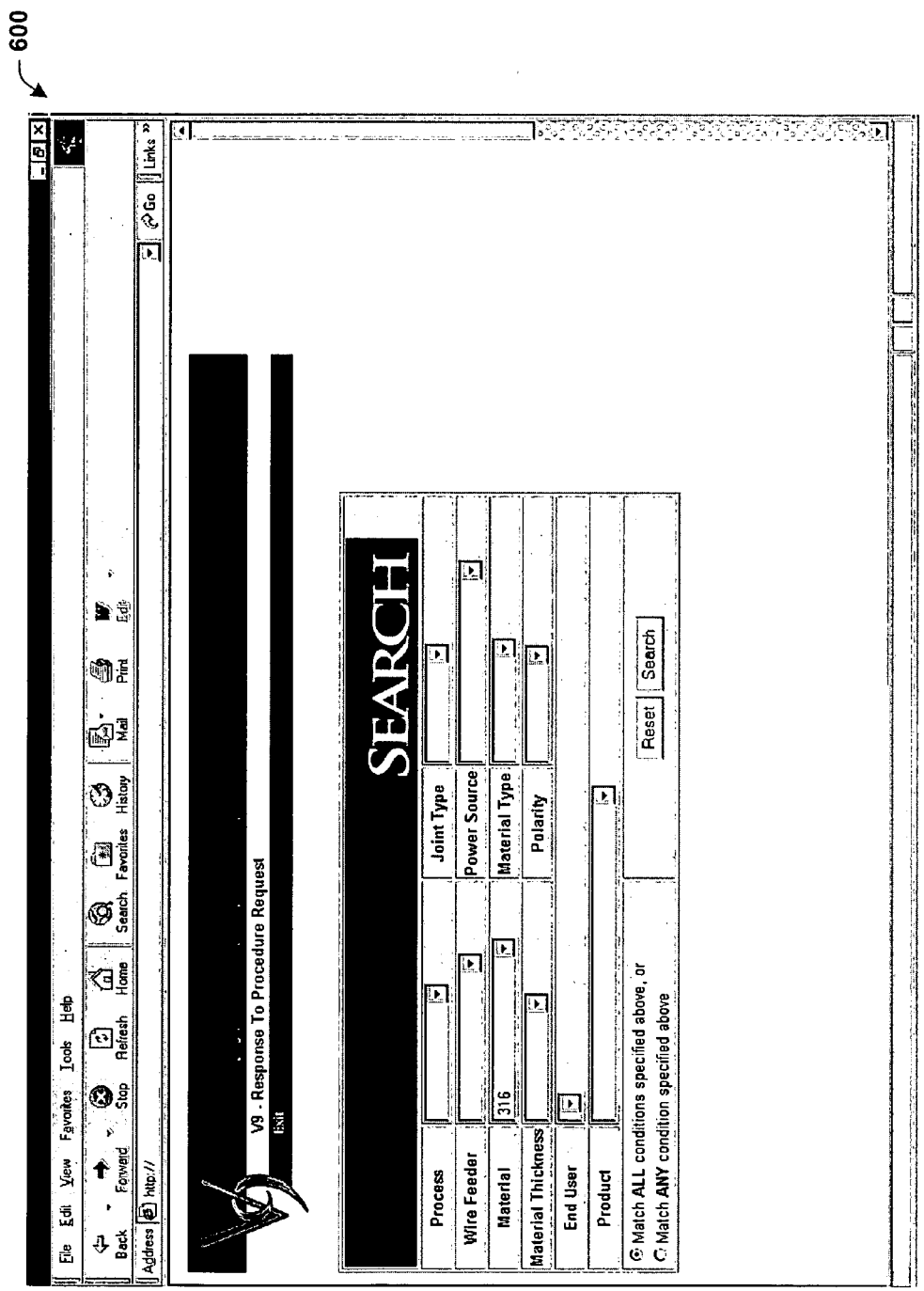
FIG. 6 is a simulated screen shot of a user interface employed with an aspect of the present invention.
Figure 7:
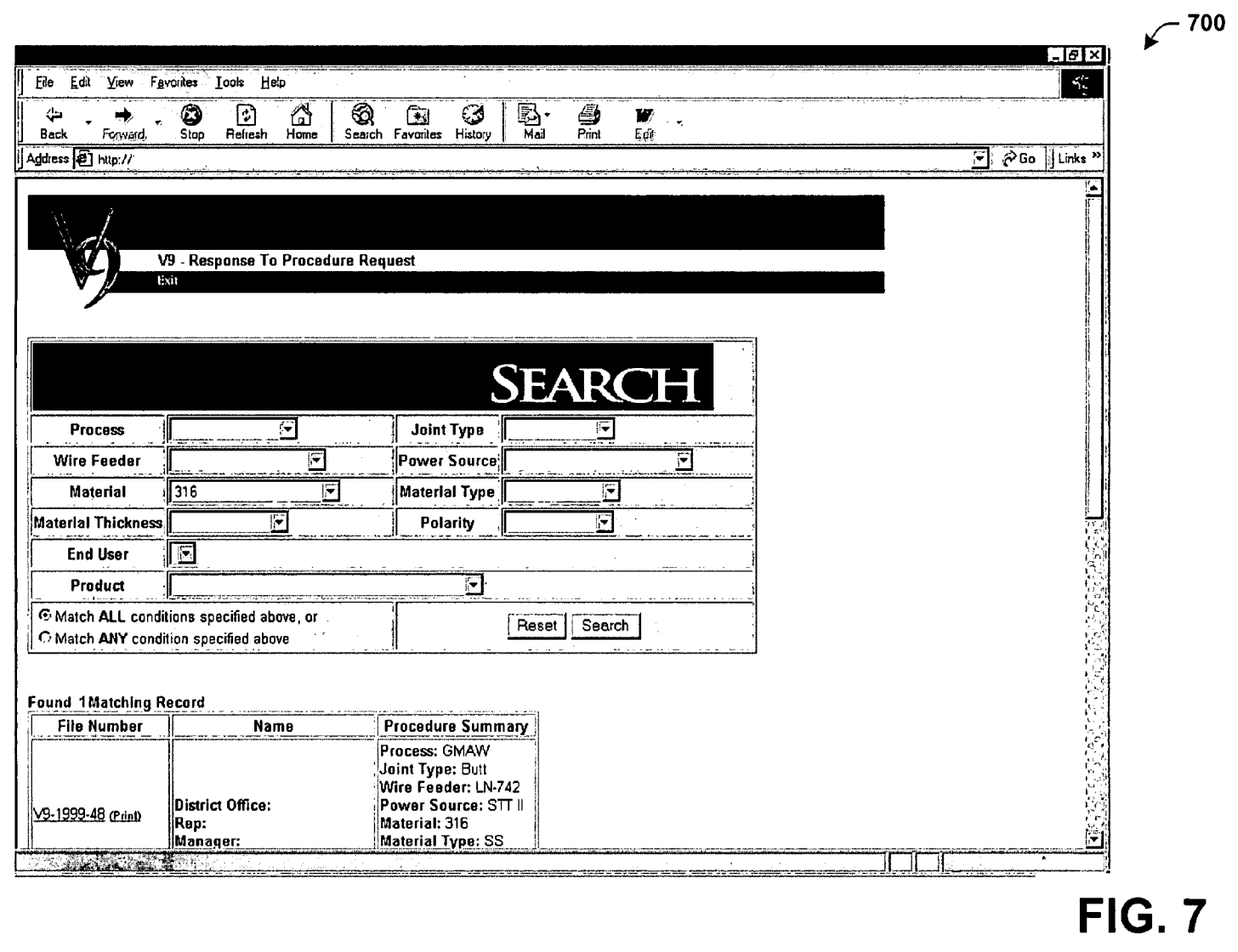

Referring to FIG. 6, a simulated screen shot 600 of user interface elements that can be employed to support various aspect of the present invention is illustrated. For example, the welder 104/user can select the process, wire feeder, material, material thickness, end user, product, joint type, power source, material type and/or polarity when searching for potentially suitable welding procedure(s). Next, turning to FIG. 7, a simulated screen shot 700 of search results is illustrated. Once presented to the welder 104/user, the welder 104/user can select welding procedure(s) to be transmitted to the welder 104.

Turning again to FIG. 1, the design of experiment(s) component 132 facilitates creation of welding procedure(s) based upon a welder 104/user's requirement(s). Thus, if a welder 104/user determines that results received via the search component 140 are not acceptable and/or the search component 140 yielded no records responsive to the welder/user's query, the process of generating a welding procedure can be initiated by the design of experiment(s) component 132. The design of experiment(s) component 132 can receive welding information, for example weld parameter(s), from the query component 144, from the welder 104 and/or from the user. The design of experiment(s) component 132 can initiate creation of a welding procedure(s) based at least in part upon welding information received from the welder 104 and/or user and/or set(s) of pre-existing related welding procedure(s) and/or data. After a suitable welding procedure(s) is developed by, for example, a manufacturer of welding consumable(s), the welding procedure(s) can be qualified and/or transmitted to the welder 104/user.

Once the welder 104/user has selected one or several welding procedure(s) via the search component 140 and/or the design of experiment(s) component 132, the cost calculation component 128 is adapted to calculate a relative cost associated with the selected welding procedure(s). The cost calculation component 128 can determine the relative cost of employing the welding procedure in various geographic locations (e.g., taking into account labor costs and/or overhead associated with different location). The cost calculation component 128 can further present cost optimization scenarios to the user (e.g., utilization of a different welding consumable and/or welding environment). Thus informed of the cost associated with implementation of the welding procedure, the welder 104/user (e.g., welding engineer) can determine whether to have a specific welding procedure transmitted to the welder 104.

Further, the resource planning component 124 can facilitate communication of information associated with the welding procedure (e.g., potential need for additional welding consumable(s) and/or potential increase in usage of particular welding consumable(s)) based at least in part upon the user's decision to have the welding procedure transmitted to the welder 104. For example, the resource planning component 124 can transmit information to a customer's inventory & distribution system (not shown) in order to accommodate resources (e.g., welding consumable(s) and/or other materials) used by the welding procedure.

For example, a welding engineer can establish a secure connection between the welder 104 and the remote system 120 via the network through the security component 148. Once the secure connection has been established and access rights of the welding engineer determined, the welding engineer can, for example, search for welding procedure(s) suitable for welding two pieces of ASTM A588 metal utilizing a stick welder. The welding engineer can communicate the welding parameter(s) via the input device(s) 116 (e.g., keyboard) to the query component 144. Once a query has been formulated, the search component 140 can search the welding information data store 156 and/or the customer welding information data store 152 for suitable welding procedure(s). The results of the search can be communicated to the filter component 136 for presentation to the welding engineer via, for example, the output device 112. The welding engineer can then select a welding procedure for transmittal and, optionally, storage to memory 108. The cost calculation component 128 can determine the relative cost associated with implementation of the welding procedure. The resource planning component 124 can communicate information associated with the welding procedure to, for example, the welding engineer's inventory & distribution system (not shown).

Figure 8:
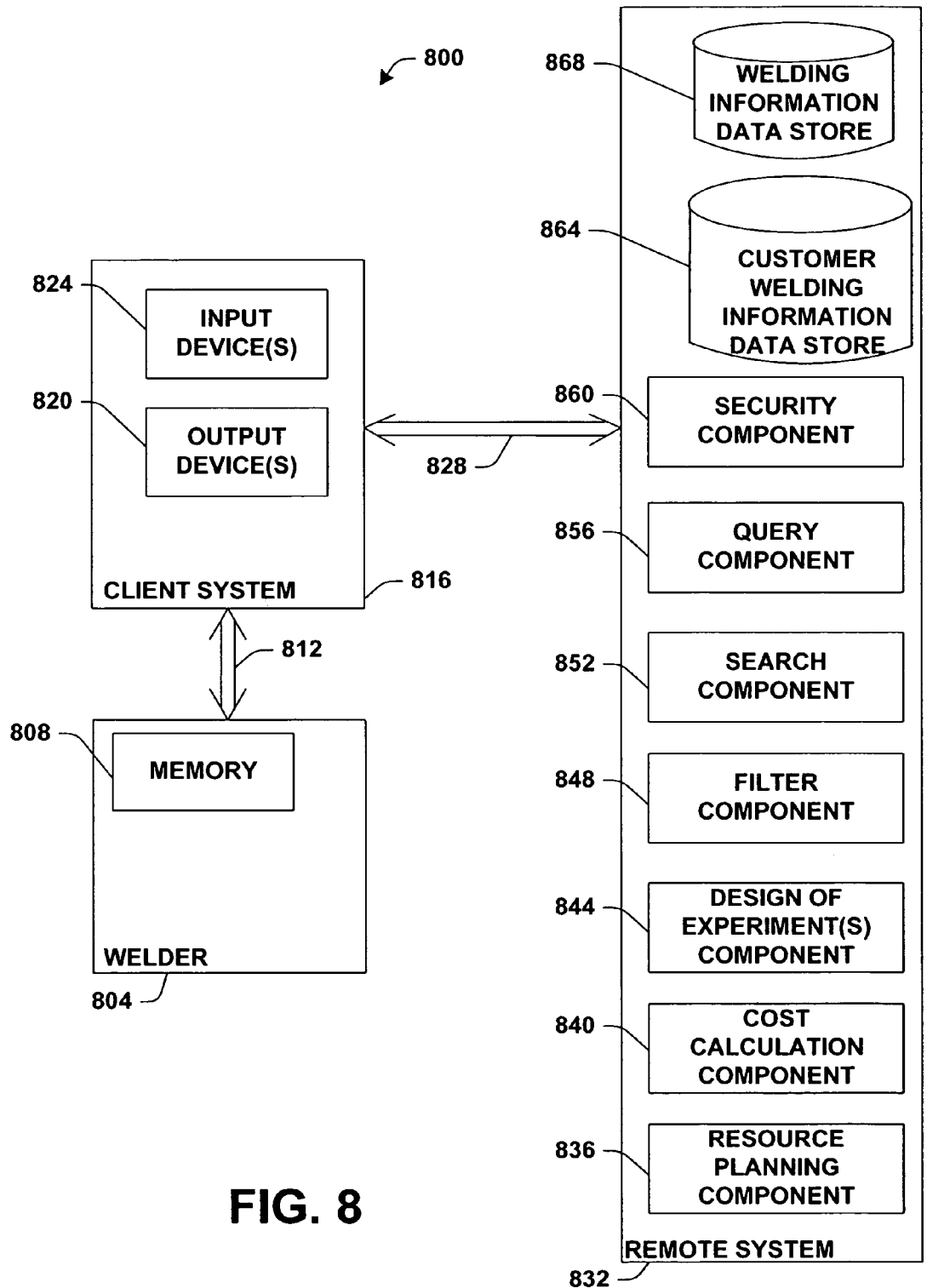
FIG. 8 is a schematic block diagram illustrating a system for managing welding information in accordance with an aspect of the present invention.

Next, referring to FIG. 8, a system 800 for managing welding information in accordance with an aspect of the present invention is illustrated. The system 800 includes a client system 816 having an input device(s) 824 and, optionally, an output device(s) 820. The client system can utilize the input device(s) 824 to receive information (e.g., weld parameter(s), information request(s)) from a user (not shown). For example, the input device(s) 824 can be a keyboard, a personal digital assistant (PDA), a mouse, a pointing device, a touch screen or other suitable device. The client system 816 can utilize the output device(s) 820 to present welding information to a user. For example, the output device(s) 820 can be a display, personal digital assistant (PDA), printer, mobile telephone or other suitable device. It is to be appreciated that, in accordance with the present invention, the client system 816 can operate without the output device(s) 820.

The system 800 can further, optionally, include a welder 804 having memory 808. The welder 804 and the client system 816 are operatively coupled via a first network 812. For example, the first network 812 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP and User Datagram Protocol (UDP). Information exchanged between and among the client system 816 and the welder 804 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, XML, PDF, EDI, WML as well as other formats.

The client system 816 is operatively coupled via a second network 828 to a remote system 832. For example, the second network 828 can employ Ethernet (IEEE 802.3), Wireless Ethernet (IEEE 802.11), PPP (point-to-point protocol), point-to-multipoint short-range RF (Radio Frequency), WAP (Wireless Application Protocol), Bluetooth, IP, IPv6, TCP and User Datagram Protocol (UDP). Further, the network connection can be via an extranet and/or a shared private network. For example, the network connection can be via a phone connection (not shown) from the client system 816 to an Internet Service Provider (ISP) to the remote system 832. Another possible network connection is via a Local Area Network (LAN) to the remote system 832. Information exchanged between and among the client system 816 and the remote system 832 can be in a variety of formats and can include, but is not limited to, such technologies as HTML, SHTML, VB Script, JAVA, CGI Script, JAVA Script, dynamic HTML, PPP, RPC, TELNET, TCP/IP, FTP, ASP, XML, PDF, EDI, WML as well as other formats. It is to be appreciated that the welder 804 and associated welding equipment (not shown) can communicate over a separate and isolated network (e.g., Arclink) from the first network 812 and/or the second network 828.

The remote system 832 can include a welding information data store 868, a customer welding information data store 864, a security component 860, a query component 856, a search component 852, a filter component 848, a design of experiment(s) component 844, a cost calculation component 840 and a resource planning component 836.

The security component 860 facilitates secure communication between the client system 816 and the remote system 832 and can provide encrypted data communications along with authentication and authorization services as described previously. The security component 860 can further employ encryption that can be established utilizing one or more of the protocols discussed above. Negotiations can occur between the security component 860 of the remote system 832 and the client system 816 to establish a secure (e.g., encrypted) data channel, for example, between the TCP/IP drivers (not shown) of the client system 816 and the remote system 832.

The security component 860 can define access rights based upon the type of user/welder and/or the particular user/welder. For example, a user having a single welder can be permitted access to welding information accessible to substantially all users while a user having hundreds of welders (e.g., automated factory) possibly spread across various geographical locations can be permitted access to welding information accessible to substantially all users along with information accessible to users associated with a particular entity (e.g., welding procedure(s) for particular part number(s) and/or plant location(s)). The security component 860 thus facilitates secure communication and/or validates access of information based at least in part upon access rights granted to the welder 804 and/or a user.

The welding information data store 868 can store information associated with welding resources, for example, welding consumable(s), welding products (e.g., welder(s)) and/or welding procedures (e.g., technical responses, engineering report(s) and/or certificate(s) of conformance). Information of a general nature can be stored in the welding information data store 868 (e.g., technical bulletins and/or engineering reports) and made accessible to substantially all users. Further, information unique (e.g., proprietary and/or confidential) to a particular user and/or group of users (e.g., associated with a particular customer) can be stored in the welding information data store 868 with access to the unique information available to the particular user and/or group of users. Access to information stored in the welding information data store 868 can be based, at least in part, upon access rights received from the security component 860.

The customer welding information data store 864 can store information associated with a particular customer and/or group of customers. For example, the customer welding information data store 864 can store customer specific welding procedure(s) (e.g., based upon customer specific part number(s) and/or customer's specification(s)), customer specific welding procedure qualification record(s) and/or customer specific welder qualification record(s) and other qualification to meet ISO standard(s). The customer welding information data store 864 can serve as a central depository for a customer's welding information across, for example, geographic and/or corporate division boundaries. Access to information stored in the customer welding information data store 864 can be based upon access rights received from the security component 860.

It is to be appreciated that while the welding information data store 868 and the customer welding information data store 864 have been depicted and described separately, in accordance with the present invention, the customer welding information data store 864 and the welding information data store 868 can be located within the same data storage system or in a distributed storage environment. Further, information in the customer welding information data store 864 and/or the welding information data store 868 can be stored in a variety of data structures including, but not limited to, lists, arrays and/or databases. Further, information in the welding information data store 868 and/or the customer welding information data store 864 can include one or more of the following: data stored in a relational database, data stored in a hierarchical database, text documents, graphical images, audio information, streaming video and other information associated with welding.

The query component 856 facilitates formulating search criteria for the search component 852 to locate welding information for a user and/or a welder 804. For example, the query component 856 can be adapted to extract weld parameter(s) from a user query (e.g., based upon natural language input) and/or associated with a user query based upon a graphical template requiring certain welding information to be completed (e.g., type of welding process—SMAW, GMAW, GTAW, FCAW-GS, FCAW-SS or SAW) and/or allowing yet other weld information to be specified optionally (e.g., wire diameter). The query component 856 can further employ an adaptive system wherein the query component is able to identify one, some and/or substantially all of the welding information based upon information communicated to the query component 856 by the welder client system 816 and/or extracted from client system 816 and/or the welder 804 by the query component 856 (e.g., type of welder, type of wire presently being utilized and/or type of gas presently being utilized). Thus, it is to be appreciated that in accordance with the present invention, the welding information can be received, explicitly and/or implicitly, in a plurality of ways in accordance with the present invention.

In response to receiving a query for welding information from the query component 856, the search component 852 searches for welding information. The search component 852 can employ various techniques (e.g., based upon a Bayesian model, an artificial intelligence model, probability tree networks, fuzzy logic and/or neural network) when searching for welding information. The search component 852 can search, for example, the welding information data store 868 and/or the customer welding information data store 864 for welding information responsive to the query and can further determine which resource(s) to search based, at least in part, upon access rights received from the security component 860.

Next, the filter component 848 is adapted to filter result(s) received from the search component 852. For example, the result(s) received from the search component 852 can be ranked according to the likelihood of usefulness (e.g., based on previous history and/or user's application needs and parameter(s)), sorted based on welding consumable(s) utilized by a welding procedure and/or arranged by qualification date of welding procedure(s).

The design of experiment(s) component 844 facilitates creation of welding procedure(s) based upon a user's requirement(s). Thus, if a user determines that results received via the search component 852 are not acceptable and/or the search component 852 yielded no records responsive to the user's query, the process of generating a welding procedure can be initiated by the design of experiment(s) component 844. The design of experiment(s) component 844 can receive welding information, for example weld parameter(s), from the query component 856, from the client system 816 and/or from the user. The design of experiment(s) component 844 can initiate creation of a welding procedure(s) based at least in part upon welding information received from a user and/or set(s) of pre-existing related welding procedure(s) and/or data. Further, the design of experiment(s) component 844 can allow for communication between the client system 816 and the remote system 832, for example, to allow for refinement of an experiment by a welding engineer. The communication can occur, for example, by telephony, email, and/or streaming audio and/or video. After a suitable welding procedure(s) is developed by, for example, a manufacturer of welding consumable(s), the welding procedure(s) can be qualified and/or transmitted to the client system 816.

Once a user has selected one or several welding procedure via the search component 852 and/or the design of experiment(s) component 844, the cost calculation component 840 is adapted to calculate a relative cost associated with the selected welding procedure. The cost calculation component 840 can determine the relative cost of employing the welding procedure in various geographic locations (e.g., taking into account labor costs and/or overhead associated with different location). The cost calculation component 840 can further present cost optimization scenarios to the user (e.g., utilization of a different welding consumable and/or welding environment). Thus informed of the cost associated with implementation of the welding procedure, the user (e.g., welding engineer) can determine whether to have a specific welding procedure transmitted to the client system 816.

The resource planning component 836 can facilitate communication of information associated with the welding procedure (e.g., potential need for additional welding consumable(s) and/or potential increase in usage of particular welding consumable(s)) based at least in part upon the user's decision to have the welding procedure transmitted to the client system 816. For example, the resource planning component 836 can transmit information to a customer's inventory & distribution system (not shown) in order to accommodate resources (e.g., welding consumable(s) and/or other materials) used by the welding procedure.

Figure 9:
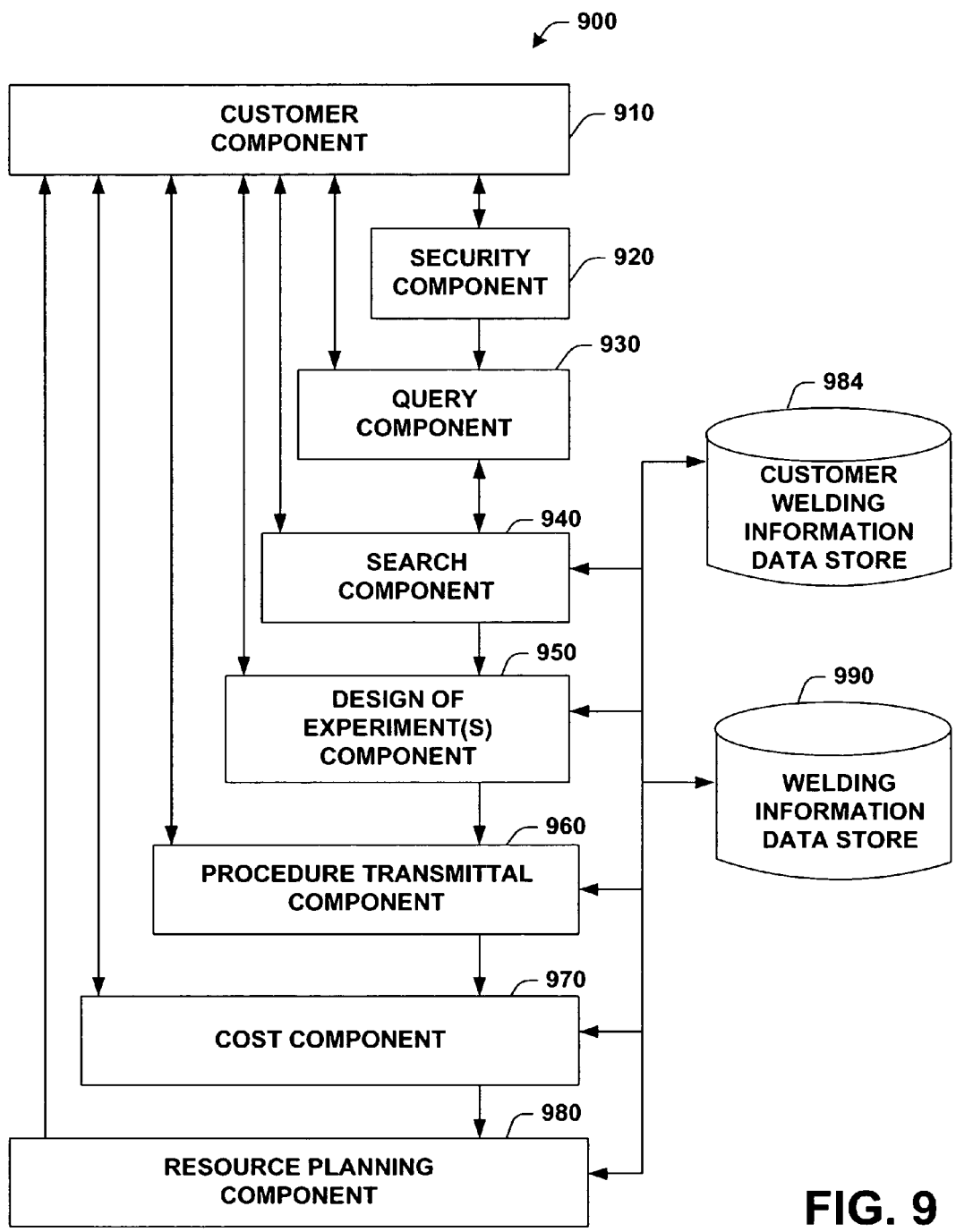
FIG. 9 is a block diagram illustrating a system for managing welding information in accordance with an aspect of the present invention.

Referring to FIG. 9, a system 900 for managing welding information is illustrated. The system 900 includes a customer component 910 for receiving user input and transmitting information to the user. For example, the customer component can be a computer system equipped with a graphical display, keyboard and memory. The system 900 can further include a security component 920, a query component 930, a search component 940, a design of experiment(s) component 950, a procedure transmittal component 960, a cost component 970 and/or a resource planning component 980. The system 900 can further include a customer welding information data store 984 and/or welding information data store 990.

The security component 920 can facilitate secure transmission of information between the customer component 910 and the query component 930, the search component 940, the design of experiment(s) component 950, the procedure transmittal component 960, the cost component 970 and/or the resource planning component 980. The security component 920 can further establish access rights based upon the type of user and/or particular user, thus facilitating secure communication and/or access of information by the customer component 910.

The query component 930 facilitates formulating search criteria for the search component 940 to locate welding information for a user. For example, the query component 940 can utilize artificial intelligence methods to extract weld parameter(s) from a user query (e.g., natural language input).

Once secure communications and/or access rights have been determined by the security component 920, in response to a user query communicated via the customer component 910, the query component 930 can extract welding parameter(s) that are communicated to a search component 940. Additionally the query component 930 can identify some and/or substantially all of the welding parameter(s) based upon information known to the customer component 910 (e.g., type of welder, type of wire presently being utilized and/or type of gas presently being utilized)

The search component 940 can search customer welding information data store 984 and/or welding information data store 990 in response to receiving a query from the query component 930. The search component 940 can employ various techniques (e.g., based upon a Bayesian model, an artificial intelligence model, probability tree networks, fuzzy logic and/or neural network) when searching for potentially suitable welding procedure(s).

The design of experiment(s) component 950 facilitates creation of welding procedure(s) based at least in part upon a user's requirement(s) and/or set(s) of pre-existing related welding procedure(s) and/or data. The design of experiment(s) component 950 can receive welding information from the search component 940 and/or the customer component 910. The design of experiment(s) component 950 can initiate creation of welding procedure(s).

The procedure transmittal component 960 can receive information from the search component 940 and/or the design of experiment(s) component 950 associated with welding procedure(s) and transmit the welding procedure(s) and/or associated information to the customer component 910. The cost component 970 can calculate welding costs associated with selected welding procedure(s) and communicate the costs to the customer component 910. The resource planning component 980 can communicate information associated with welding procedure(s) (e.g., potential need for additional welding consumable(s) and/or potential increase in usage of particular welding consumable(s)) to the customer component 910.

Figure 10:
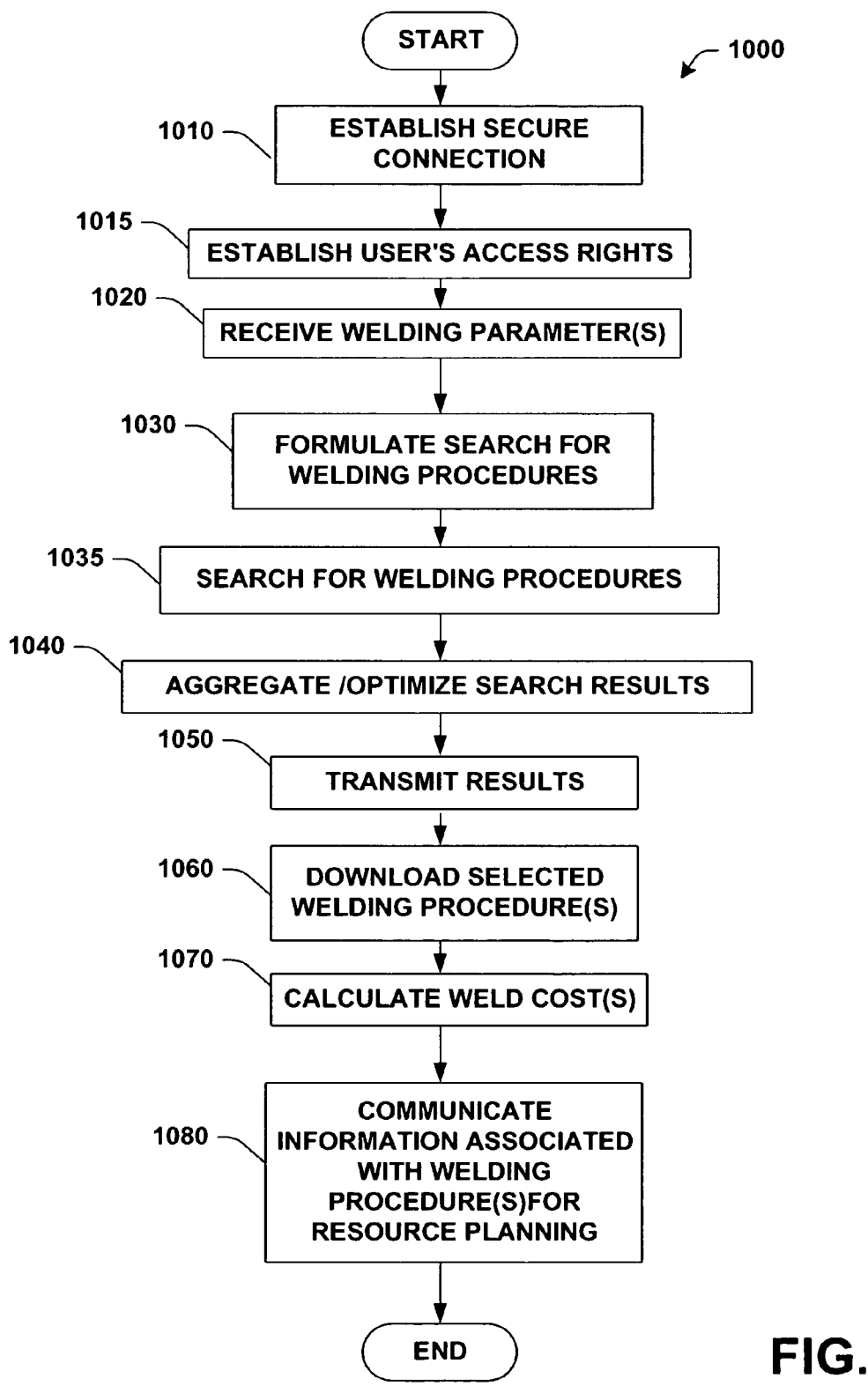
FIG. 10 is a flow diagram illustrating a methodology for managing welding information in accordance with an aspect of the present invention.
Figure 11:
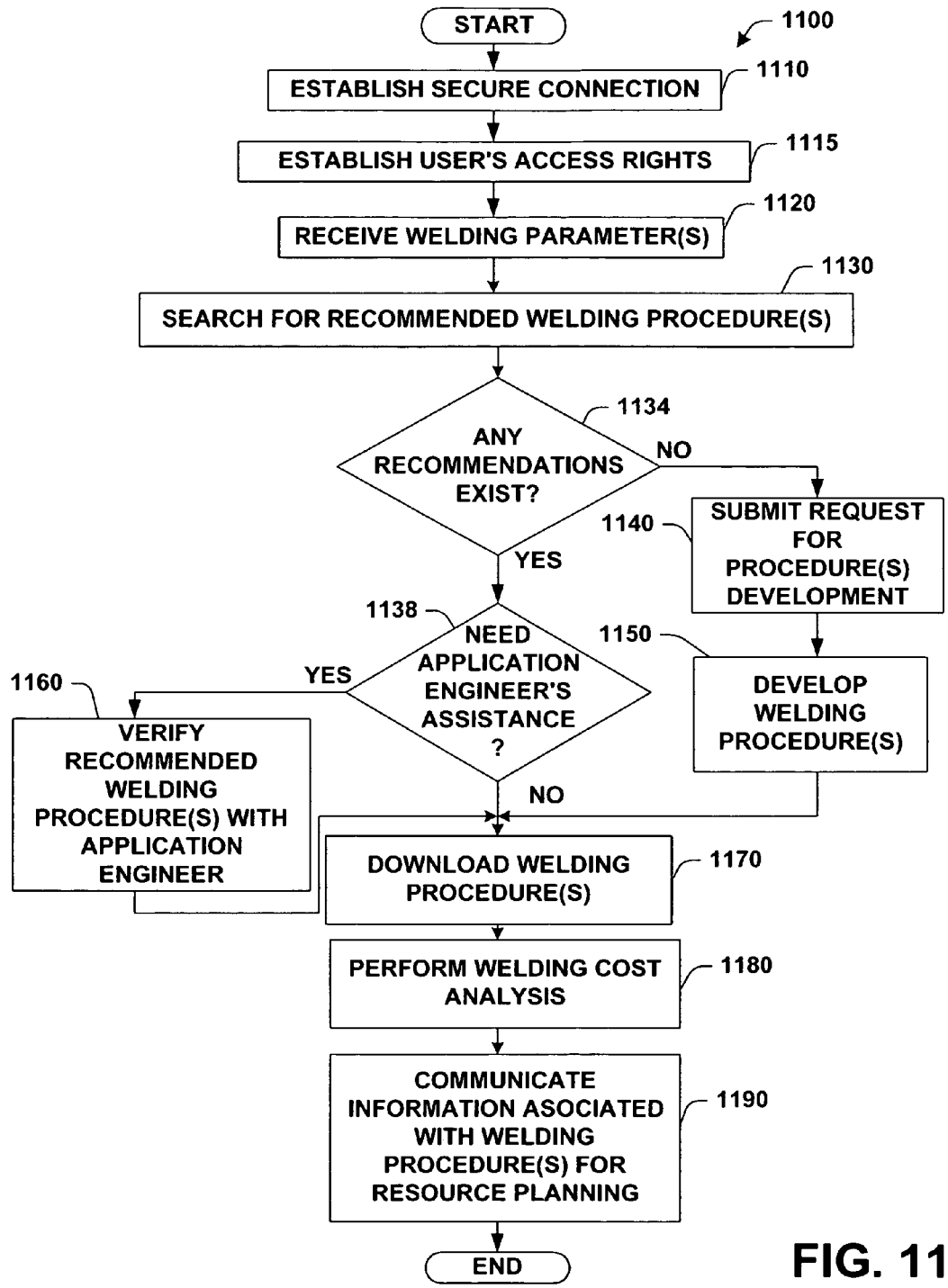
FIG. 11 is a flow diagram illustrating a methodology for managing welding information in accordance with an aspect of the present invention.

FIGS. 10 and 11 illustrate methodologies for providing various aspects of a distributed welding architecture in accordance with the present invention. The methods comprise a group of actions or processes represented by blocks. While, for purposes of simplicity of explanation, the methodologies are shown and described as a series of blocks, it is to be understood and appreciated that the present invention is not limited by the number or order of blocks, as some blocks may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Turning to FIG. 10, a methodology 1000 for managing welding information is illustrated. At 1010, a secure connection is established. At 1015, access rights of the user are established. At 1020, weld parameter(s) are received. At 1030, a search for welding procedure(s) is formulated. At 1035, a search for welding procedure(s), based at least in part upon weld parameter(s) received and/or user access rights, is performed. At 1040, results of the search are aggregated and/or optimized. At 1050, the results of the search are transmitted. At 1060, selected welding procedure(s) are downloaded (e.g., to a local system and/or welder). At 1070, weld cost(s) associated with the selected welding procedure(s) are calculated. At 1080, information associated with the selected welding procedure(s) is communicated (e.g., to a local system and/or welder.)

Referring to FIG. 11, a methodology 1100 for managing welding information is illustrated. At 1110, a secure connection is established. At 1115, access rights of the user are established. At 1120, welding parameter(s) are received. At 1130, a search for welding procedure(s), based at least in part upon welding parameter(s) received and/or user access rights, is performed. At 1134, a determination is made as to whether any recommended welding procedure(s) exist. If the determination at 1134 is NO, at 1140, a request is submitted to a designated welding application group for off-line and/or on-line welding procedure development. At 1150, welding procedure(s) are developed using various technique(s), for example, design of experiment(s) (e.g., with or without human intervention) and processing continues at 1170. If the determination at 1134 is YES, at 1138 a determination is made as to whether an application engineer's assistance is needed. If the determination at 1138 is NO, processing continues at 1170. If the determination at 1138 is YES, at 1160, the recommended welding procedure(s) are verified with an application engineer (e.g., by email, telephony and/or streaming audio/video). Next, at 1170, the welding procedure(s) are downloaded (e.g., to a local system and/or welder). At 1180, an analysis of welding cost(s) associated with the recommended welding procedure(s) is performed. At 1190, information associated with the recommended welding procedure(s) is communicated to a customer for resource planning (e.g., to a customer's inventory system).

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for communicating welding information, comprising:
a welder comprising physical hardware that produces a weld, a user interface configured to receive an input of a wire diameter and a welding process comprising at least one of gas metal arc welding, gas tungsten arc welding, and flux cored arc welding, and a communication interface configured to initiate a request for a welding procedure based on the wire diameter and the welding process via the Internet; and
a remote system that communicates with the welder across the Internet, the remote system comprising:
a query component that identifies the wire diameter and the at least one of gas metal arc welding, gas tungsten arc welding, and flux cored arc welding and formulates a query for welding procedures using the wire diameter and the at least one of gas metal arc welding, gas tungsten arc welding, and flux cored arc welding;
a search component that searches a database according to the query and finds a plurality of different welding procedures;
a design of experiments component that initiates generation of a further welding procedure based on welding parameters received from the query component; and
a cost calculation component that determines costs of employing at least one of the plurality of different welding procedures at different geographic locations based on different labor and overhead costs at the different geographic locations;
wherein the remote system communicates the plurality of different welding procedures and the further welding procedure to the welder.

2. The system of claim 1, wherein the database is a relational database, or a hierarchical database.

3. The system of claim 1, wherein the welder further comprises an input configured to receive a user-selected welding procedure from the remote system.

4. The system of claim 1, wherein the welder further comprises an output device that presents the plurality of different welding procedure to a user.

5. The system of claim 1, wherein the remote system further comprises a security component that establishes a secure network connection between the welder and the remote system.

6. The system of claim 5, wherein the security component employs a secure sockets layer to establish the secure network connection.

7. The system of claim 5, wherein the security component employs at least one of authentication, authorization, or encryption to establish the secure network connection.

8. The system of claim 1, wherein the search component searches the database using one of a Bayesian model, a probability tree network, an artificial intelligence model, a fuzzy logic model, or a neural network.

9. The system of claim 1, wherein the remote system further comprises a filter component that filters results from the search component.

10. The system of claim 1, wherein the remote system further comprises a resource planning component that communicates the at least one of the plurality of different welding procedures to a customer system, wherein the customer system comprises an inventory management system or a materials management system.

11. A method, comprising:

receiving a request, from a welder, for a welding procedure comprising a wire diameter and a welding process comprising at least one of gas metal arc welding, gas tungsten arc welding, and flux cored arc welding, based on information input by a user through a user interface of the welder, at a location remote from the welder via the Internet;

formulating a query at the location remote from the welder using the wire diameter and the at least one of gas metal arc welding, gas tungsten arc welding, and flux cored arc welding;

searching a database at the location remote from the welder according to the query and discovering a plurality of different welding procedures satisfying the query;

communicating results of the step of searching from the location remote from the welder to the welder via the Internet;

generating a further welding procedure based on welding parameters from the welder that are received at the location remote from the welder; and determining costs of employing at least one of the plurality of different welding procedures at different geographic locations based on different labor and overhead costs at the different geographic locations.

12. The method of claim 11, wherein the query is based on an access right of a user.

13. The method of claim 11, further comprising ranking the plurality of different welding procedures.

14. The method of claim 13, wherein the ranking further comprises ranking the plurality of different welding procedures based on a plurality of weld cost associated with the plurality of different weld procedures.

\* \* \* \* \*